(12) United States Patent
Son et al.

(10) Patent No.: US 9,842,604 B2
(45) Date of Patent: Dec. 12, 2017

(54) APPARATUS AND METHOD FOR IMPROVING COMMUNICATION QUALITY OF RADIO

(71) Applicant: ELECTRONICS AND TELECOMMUNICATIONS RESEARCH INSTITUTE, Daejeon (KR)

(72) Inventors: Young Ho Son, Daejeon (KR); CheolYong Park, Daejeon (KR); Tae uk Yang, Daejeon (KR); Jang Hong Yoon, Daejeon (KR); Jeong-Seok Lim, Daejeon (KR); Jung-Gil Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 131 days.

(21) Appl. No.: 14/463,788

(22) Filed: Aug. 20, 2014

(65) Prior Publication Data

US 2015/0120284 A1 Apr. 30, 2015

(30) Foreign Application Priority Data

Oct. 30, 2013 (KR) ........................ 10-2013-0129952

(51) Int. Cl.
*G10L 21/003* (2013.01)
*H04W 88/18* (2009.01)

(52) U.S. Cl.
CPC ......... *G10L 21/003* (2013.01); *H04W 88/181* (2013.01)

(58) Field of Classification Search
CPC combination set(s) only.
See application file for complete search history.

(56) References Cited

U.S. PATENT DOCUMENTS

2005/0065780 A1* 3/2005 Wiser ............... G11B 20/10527
704/201
2007/0054686 A1* 3/2007 Allen .................. H04W 76/005
455/518

(Continued)

FOREIGN PATENT DOCUMENTS

EP 2 512 057 A2 10/2012
KR 10-2006-0126813 A 12/2006

(Continued)

*Primary Examiner* — Marivelisse Santiago Cordero
*Assistant Examiner* — Keara Harris
(74) *Attorney, Agent, or Firm* — LRK Patent Law Firm

(57) ABSTRACT

An apparatus includes a user input unit, a display unit, a control unit, and a buffer unit. The display unit includes a speed setting menu. The control unit selects a mode from the speed setting menu in response to the selection signal of the user, and controls a compression ratio of a voice codec and a transfer rate of a modem corresponding to a transmission-side radio, and a reception rate of a modem and a restoration rate of a voice codec corresponding to a reception-side radio, based on the selected mode. The buffer unit performs a storage function if there is a difference between the compression ratio of the voice codec and the transfer rate of the modem or if there is a difference between the reception rate of the modem and the restoration rate of the voice codec.

6 Claims, 6 Drawing Sheets

(56) References Cited

U.S. PATENT DOCUMENTS

2007/0195749 A1     8/2007   Kakimoto
2012/0263302 A1*   10/2012   Son ...................... H04L 1/0002
                                                                     380/275

FOREIGN PATENT DOCUMENTS

| KR | 10-2007-0023921 A | 3/2007 |
| KR | 10-2011-0032132 A | 3/2011 |
| KR | 10-2011-0121675 A | 11/2011 |
| KR | 10-2012-0116137 A | 10/2012 |
| WO | 2001/082498 A2 | 11/2001 |

* cited by examiner

APPARATUS AND METHOD FOR IMPROVING COMMUNICATION QUALITY OF RADIO

CROSS-REFERENCE TO RELATED APPLICATION

This application claims the benefit of Korean Patent Application No. 10-2013-0129952, filed Oct. 30, 2013, which is hereby incorporated by reference in its entirety into this application.

BACKGROUND OF THE INVENTION

1. Technical Field

The present disclosure relates generally to an apparatus and method for improving the communication quality of a radio and, more particularly, to an apparatus and method for improving the communication quality of a radio, which are capable of smoothly sending and restoring user voice data even when it is difficult for a reception-side radio to normally receive the user voice data due to a transmission error attributable to a high bit error in a channel upon making voice communication using a radio over a poor-quality radio channel, such as a short-wave channel.

2. Description of the Related Art

Radios (Walkie-talkies, Two-way radios) were first developed in the early 1940's, and started to be used in the military and in industrial fields in various manners from the Second World War.

In general, radios can directly communicate with each other without requiring a separate system, such as a base station. Since one-to-many communication can be performed using radios, radios are widely used in operating environments requiring command and control, such as in the military or in industrial fields.

Radios using an analog method were used in the past, but recently radios using a digital method are commonly used in line with the advancement of communication technology. Radios may be basically classified into radios for a high frequency (HF) channel, radios for a very high frequency (VHF) channel, and radios for an ultra-high frequency (UHF) channel depending on the frequency bands used.

In the case of a short-wave channel, a change in channel is considerable depending on the time at which communication is performed and the place in which communication is performed, and there is the case where a bit error rate (BER) increases to a $10^{-2}$ level at which it is almost impossible to perform voice communication using an analog method-based radio.

For example, Korean Patent Application Publication No. 10-2011-0121675 entitled "Communication Bluetooth System" discloses a method of controlling input voice in order to provide PTT service, such as that of a radio, in a mobile communication terminal.

In a radio channel to which such a radio communication device is applied, when data is sent over the channel, an error inevitably occurs due to noise, interference, and fading depending on channel conditions, and loss of data occurs due to the generated error. In order to reduce the loss of data attributable to the occurrence of the error on the reception side as described above, various error control methods are used in a modem depending on the characteristics of a channel.

In the case of a short-wave channel, a change in channel is considerable depending on the time at which communication is performed and the place in which communication is performed, and there is the case where a BER increases to a $10^{-2}$ level at which it is almost impossible to perform voice communication using an analog method-based radio.

In order to perform voice communication even over such a poor channel, a voice encoder for high compression of a user voice signal at a low transfer rate of 1,200 bps, or 600 bps lower than 2,400 bps, and a military standard modem optimized for a corresponding channel have been applied to some military radios. For example, a minimum level of voice communication can be performed using a digital method of combining a military vocoder having a transfer rate of 600 bps and a modem having a transfer rate of 600 bps even in a channel environment in which a channel error is at a high level, such as a BER $10^{-2}$ level.

If a voice signal is encoded at a low transfer rate of 2,400 bps or less as described above, communication quality is inevitably deteriorated upon restoration of the voice on the reception side due to loss of the voice signal in the encoding process. In particular, in the case of a current 600-bps vocoder, a large amount of information is lost in a voice signal due to high compression upon encoding a voice, and communication quality is considerably deteriorated on the reception side upon restoring and listening to voice. As a result, smooth communication is limited due to transmitted voice having poor articulation.

SUMMARY OF THE INVENTION

Accordingly, the present invention has been made keeping in mind the above problems occurring in the conventional art, and an object of the present invention is to provide an apparatus and method for improving the communication quality of a radio, which are capable of smoothly sending and restoring user voice data even when it is difficult for a reception-side radio to normally receive the user voice data due to a transmission error attributable to a high bit error in a channel upon performing voice communication using a radio over a poor-quality radio channel, such as a short-wave channel.

In accordance with an aspect of the present invention, there is provided a method of improving the communication quality of a transmission-side radio, including converting a voice signal of a user, received via the transmission-side radio, into voice data; compressing the voice data at a compression ratio of a voice codec set by an apparatus for improving communication quality; generating a modem signal by modulating the compressed voice data; and sending the modem signal to a reception-side radio at a transfer rate of a modem set by the apparatus for improving communication quality.

Converting the voice signal of the user into the voice data may include assigning an end identifier to the voice data if the voice signal of the user received via the transmission-side radio corresponds to a finally received signal.

The method may further include temporarily storing the modem signal before sending the modem signal to the reception-side radio if there is a difference between the compression ratio of the voice codec and the transfer rate of the modem.

The method may further include operating, by the apparatus for improving communication quality, in a normal mode or a communication quality improvement mode.

Operating, by the apparatus for improving communication quality, in the normal mode or the communication quality improvement mode may include setting the compression ratio of the voice codec and the transfer rate of the modem to an identical value if the apparatus for improving communication quality is in the normal mode; and setting the transfer rate of the modem to a value smaller than the compression ratio of the voice codec if the apparatus for improving communication quality is in the communication quality improvement mode.

In accordance with another aspect of the present invention, there is provided a method of improving the communication quality of a reception-side radio, including receiving a modem signal from a transmission-side radio at a reception rate of a modem set by an apparatus for improving communication quality; generating compressed voice data by demodulating the modem signal; restoring the compressed voice data to voice data at a restoration rate of a voice codec set by the apparatus for improving communication quality; and converting the voice data into an analog voice signal, and outputting the analog voice signal.

Outputting the analog voice signal may include outputting the analog voice signal corresponding to specific voice data if the specific voice data comprises an end identifier.

The method may further include temporarily storing compressed voice data until voice data of a corresponding communication session is fully received if there is a difference between the reception rate of the modem and the restoration rate of the voice codec.

In accordance with another aspect of the present invention, there is provided an apparatus for improving the communication quality of a radio, including a user input unit configured to receive a selection signal of a user; a display unit configured to include a speed setting menu; a control unit configured to select a mode from the speed setting menu in response to the selection signal of the user, and to control a compression ratio of a voice codec and a transfer rate of a modem corresponding to a transmission-side radio, and a reception rate of a modem and a restoration rate of a voice codec corresponding to a reception-side radio, based on the selected mode; and a buffer unit configured to perform a storage function if there is a difference between the compression ratio of the voice codec and the transfer rate of the modem or if there is a difference between the reception rate of the modem and the restoration rate of the voice codec.

The control unit may identically set the compression ratio of the voice codec and the transfer rate of the modem if the mode is a normal mode, and may set the transfer rate of the modem to a value smaller than the compression ratio of the voice codec if the mode is a communication quality improvement mode.

The apparatus may further include a sync processing unit configured to add an end identifier to voice data corresponding to a voice signal of the user finally received from the transmission-side radio.

The apparatus may further include a sync processing unit configured to detect an end identifier of voice data received from a transmission-side radio in a reception-side radio, and to perform control so that an analog voice signal is output if voice data including the detected end identifier is received.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
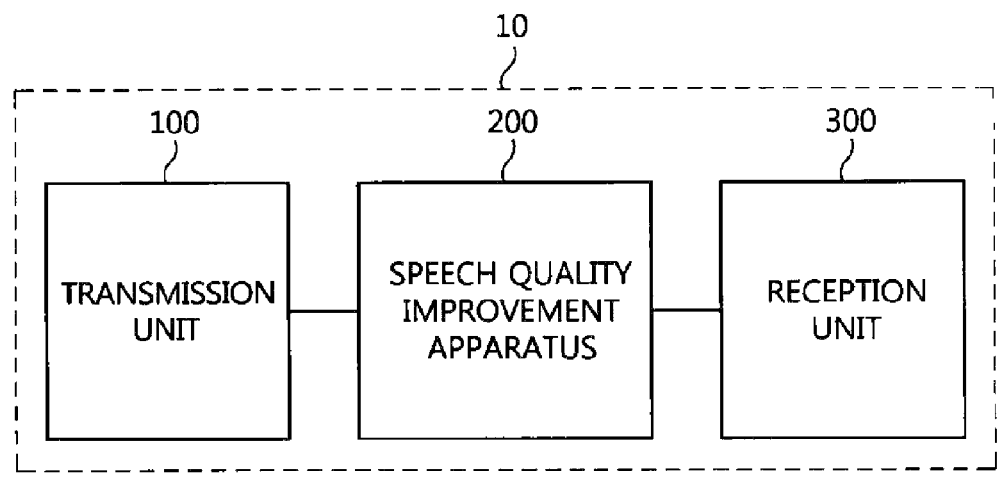
FIG. 1 is a diagram illustrating the construction of a radio using an apparatus for improving the communication quality of a radio according to an embodiment of the present invention.

Embodiments of the present invention are described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clear.

An apparatus and method for improving the communication quality of a radio according to embodiments of the present invention are described in detail below with reference to the accompanying drawings.

Figure 2:
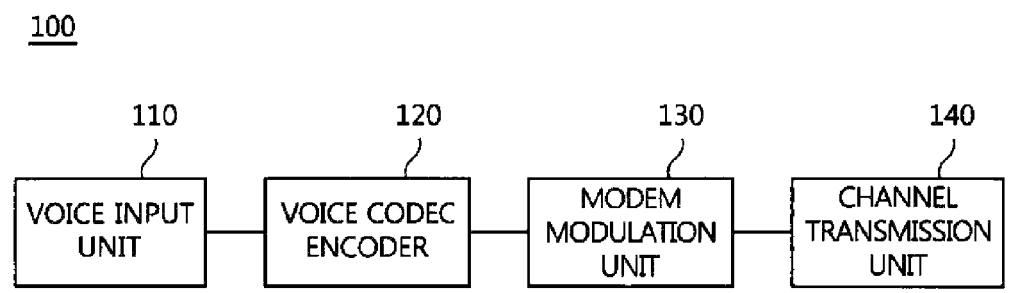
FIG. 2 is a diagram illustrating the construction of the transmission unit of the radio according to an embodiment of the present invention.
Figure 3:
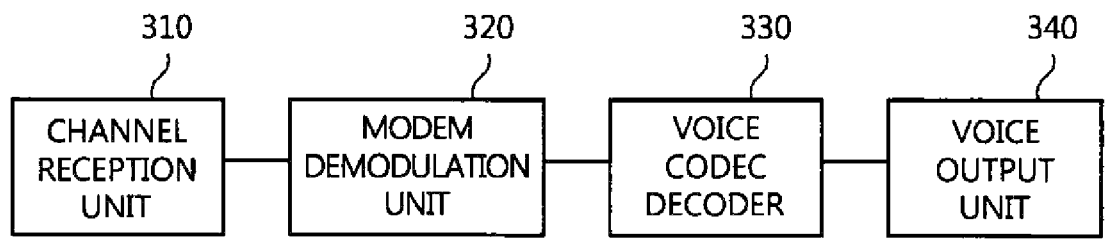
FIG. 3 is a diagram illustrating the construction of the reception unit of the radio according to an embodiment of the present invention.

FIG. 1 is a diagram illustrating the configuration of a radio 10 using an apparatus 200 for improving the communication quality of a radio according to an embodiment of the present invention. FIG. 2 is a diagram illustrating the configuration of the transmission unit 100 of the radio 10 according to an embodiment of the present invention. Furthermore, FIG. 3 is a diagram illustrating the configuration of the reception unit 300 of the radio 10 according to an embodiment of the present invention.

Referring to FIG. 1, the apparatus 200 for improving the communication quality of a radio according to this embodiment of the present invention is illustrated as being disposed within the radio 10, but is not limited thereto.

The apparatus 200 for improving the communication quality of a radio may operate in conjunction the transmission unit 100 and the reception unit 300 of the radio 10, thereby being able to further improve communication quality when sending and receiving a user's voice signals using the radio 10.

Referring to FIG. 2, the transmission unit 100 of the radio 10 includes a voice input unit 110, a voice codec encoder 120, a modem modulation unit 130, and a channel transmission unit 140.

The voice input unit 110 receives the voice signal of a user and converts the received voice signal into a pulse-code modulated (PCM) signal (hereinafter referred to as "voice data").

The voice codec encoder 120 compresses the PCM signal using a voice codec. In this case, the compression ratio of the voice codec is controlled by the apparatus 200 for improving the communication quality of a radio.

More specifically, the apparatus 200 for improving the communication quality of a radio performs a processing procedure for improving communication quality when the transmission unit 100 of the radio 10 transfers a voice signal, received from a user, to another radio.

The apparatus 200 for improving the communication quality of a radio sets the compression ratio of the voice codec and the transfer rate of a modem. Furthermore, the apparatus 200 for improving the communication quality of a radio provides a temporary storage function in order to deal with a problem that may occur due to the difference between the compression ratio of the voice codec and the transfer rate of the modem.

A method of improving the communication quality of a radio, which is performed by the apparatus 200 for improving the communication quality of a radio according to an embodiment of the present invention, is described in detail with reference to FIG. 4.

The modem modulation unit 130 modulates the compressed voice data.

The channel transmission unit 140 sends the voice data signal, modulated by the modem modulation unit 130, that is, a modem signal, based on the transfer rate of the modem set by the apparatus 200 for improving the communication quality of a radio.

That is, the channel transmission unit 140 sends the modem signal to another reception-side radio that communicates with the radio 10 over a radio channel.

Referring to FIG. 3, the reception unit 300 of the radio 10 includes a channel reception unit 310, a modem demodulation unit 320, a voice codec decoder 330, and a voice output unit 340.

The channel reception unit 310 transfers a modem signal based on the reception rate of a modem, set by apparatus 200 for improving the communication quality of a radio, over a radio channel.

The modem demodulation unit 320 demodulates the modem signal received from the channel reception unit 310.

The voice codec decoder 330 restores the compressed voice data, corresponding to the results demodulated by the modem demodulation unit 320, to a PCM signal using a voice codec. In this case, the compressed voice data has been compressed based on the restoration rate of the voice codec controlled by the apparatus 200 for improving the communication quality of a radio.

The voice output unit 340 converts the PCM signal into an analog voice signal that can be heard by a user, and outputs the analog voice signal.

The apparatus 200 for improving the communication quality of a radio of the radio 10 is described in detail below with reference to FIG. 4.

Figure 4:
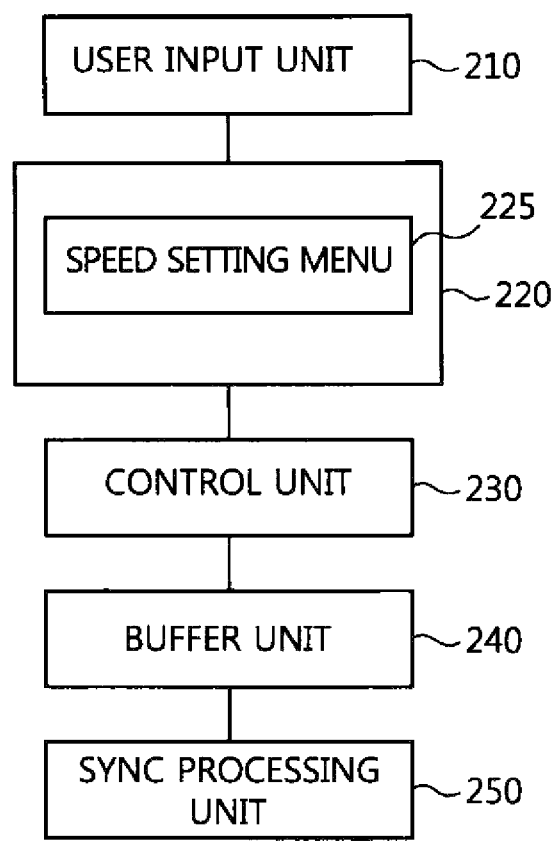
FIG. 4 is a diagram illustrating the construction of an apparatus for improving the communication quality of a radio according to an embodiment of the present invention.

FIG. 4 is a diagram illustrating the configuration of an apparatus for improving the communication quality of a radio according to an embodiment of the present invention.

Referring to FIG. 4, the apparatus 200 for improving the communication quality of a radio includes a user input unit 210, a display unit 220, a control unit 230, a buffer unit 240, and a sync processing unit 250.

The user input unit 210 receives input from a user. The input received from the user corresponds to a signal that can control factors that are used to improve the communication quality of the radio 10.

The display unit 220 displays a speed setting menu 225. The display unit 220 may be one element of the radio 10, but is not limited thereto. In this case, the speed setting menu 225 is described in detail below with reference to FIG. 5.

Figure 5:
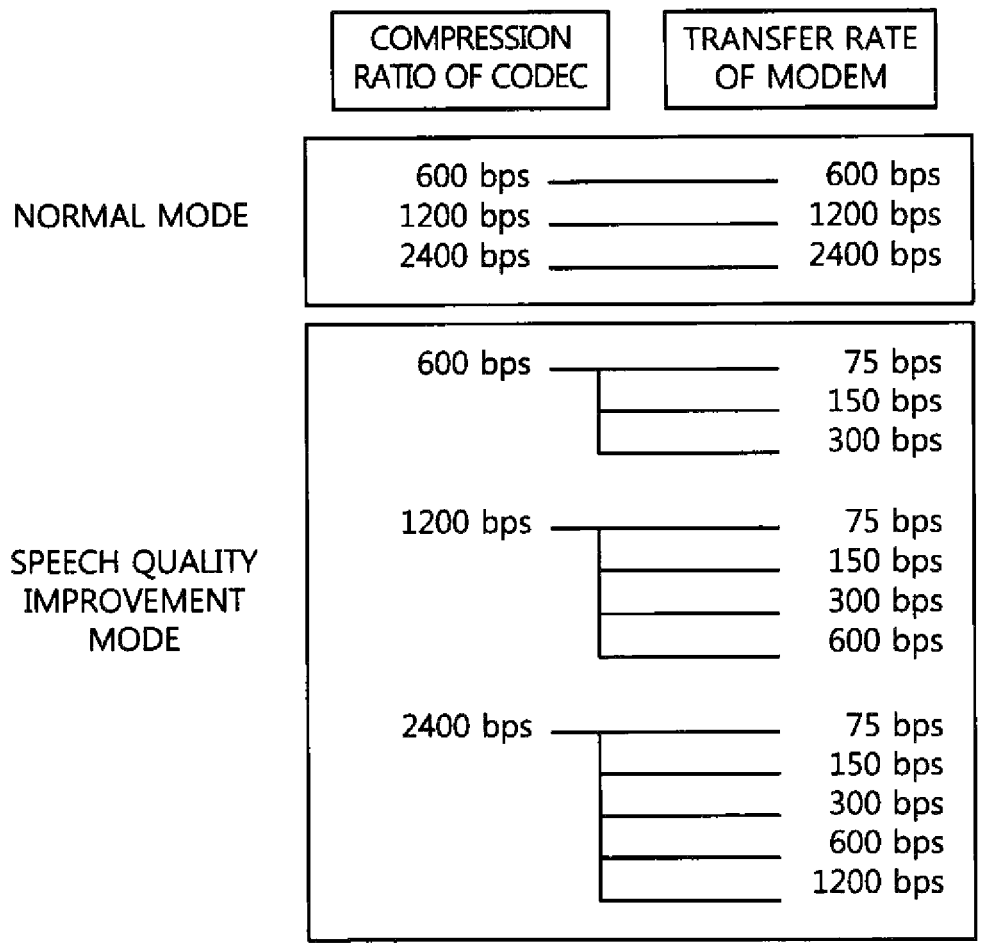
FIG. 5 is a diagram illustrating a detailed construction of a speed setting menu included in the apparatus for improving the communication quality of a radio according to an embodiment of the present invention.

FIG. 5 is a diagram illustrating the detailed configuration of the speed setting menu 225 included in the apparatus for improving the communication quality of a radio according to this embodiment of the present invention.

Referring to FIG. 5, the speed setting menu 225 includes a normal mode and a communication quality improvement mode.

In a normal mode, the compression ratio of the voice codec (i.e., the codec compression ratio of FIG. 5) and the transfer rate of the modem (i.e., the modem transfer rate of FIG. 5) are set to the same value.

In a communication quality improvement mode, the transfer rate of the modem is set to a value smaller than the compression ratio of the voice codec.

If a channel environment is poor when the radio 10 performs communication, the transfer rate of the modem may be set to a low speed so that reliable transmission is guaranteed even over a poor channel, and the compression ratio of the voice codec may be set to a value larger than the transfer rate of the modem to the extent that communication quality is guaranteed, thereby being able to guarantee reliable communication and also improve communication quality even over a poor channel environment.

For example, the compression ratio of a military voice codec provided to a radio that operates over a short-wave channel is a minimum of 600 bps. When voice is compressed at the corresponding compression ratio and the compressed voice is restored, communication quality is deteriorated due to loss of data occurring in the compression and restoration processes of the voice codec.

If a channel environment is poor in a short-wave channel, voice data compressed at 600 bps is transmitted at 600 bps so that limited voice communication is performed. In a short-wave channel, however, it is frequently difficult to send data of 600 bps depending on the operation time. In such a case, voice communication cannot be performed.

A method of improving communication quality according to an embodiment of the present invention may support a reliable voice call in a communication quality improvement mode although a voice call is impossible in a normal mode due to a poor channel environment in a short-wave channel.

The present invention is advantageous in that if data transmission is difficult, for example, at 600 bps, reliable data transmission can be guaranteed by setting the transfer rate of the modem to 300 bps, 150 bps, or 75 bps, which is lower than 600 bps, and a user can also control communication quality by setting the compression ratio of the voice codec to 600 bps, 1200 bps, or 2400 bps.

Referring to FIG. 4, the control unit 230 controls the compression ratio of the voice codec, the transfer rate of the modem, the reception rate of the modem, and the restoration rate of the voice codec based on a user selection signal received through the speed setting menu 220 of the user input unit 210.

The buffer unit 240 temporarily stores voice data in order to solve the accumulation of the voice data attributable to the difference between the compression ratio of the voice codec and the transfer rate of the modem, which may occur as a result of the control of the compression ratio of the voice codec and the transfer rate of the modem of the control unit 230.

Furthermore, the buffer unit 240 stores compressed voice data until the voice data of a corresponding communication session is fully received, in order to solve the problem that the playback of a voice stops due to the difference between the reception rate of the modem and the restoration rate of the voice codec, which may occur as a result of the control of the reception rate of the modem and the restoration rate of the voice codec of the control unit 230.

The sync processing unit 250 adds an end identifier to voice data corresponding to the voice signal of a user that has been finally received from the transmission unit 100 of the radio 10.

Furthermore, the sync processing unit 250 detects the end identifier of the voice data received via the reception unit 300 of the radio 10 from a transmission-side radio, and controls the reception unit 300 of the radio 10 so that an analog voice signal is output when voice data including an end identifier is received.

According to an embodiment of the present invention, a reception-side radio may receive voice data including an end identifier, and may determine whether or not voice data corresponding to a specific communication session has been fully received based on the end identifier, so that the voice codec decoder of the reception-side radio may restore compressed voice data and determine the time when a voice signal will be played back.

A method of improving the communication quality of a transmission-side radio is described in detail below with reference to FIG. 6.

Figure 6:
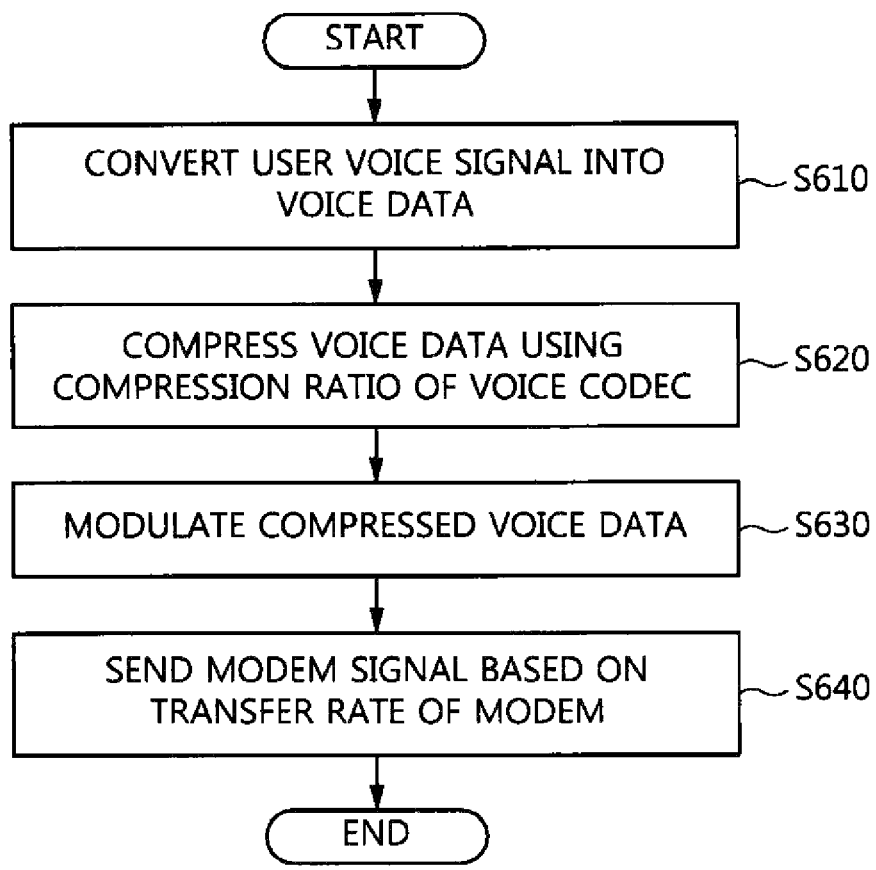
FIG. 6 is a flowchart illustrating a method of improving the communication quality of a transmission-side radio according to an embodiment of the present invention.

FIG. 6 is a flowchart illustrating the method of improving the communication quality of a transmission-side radio according to this embodiment of the present invention.

Referring to FIG. 6, the transmission-side radio receives the voice signal of a user, and converts the received voice signal into a PCM signal (also called "voice data") at step S610.

The transmission-side radio compresses the voice data, converted at step S610, at the compression ratio of the voice codec set by the apparatus 200 for improving the communication quality of a radio at step S620.

At step S630, the transmission-side radio modulates the voice data compressed at step S620.

At step S640, the transmission-side radio sends a modem signal, corresponding to the results of the modulation of the voice data obtained at step S630, to a reception-side radio at the transfer rate of the modem set by the apparatus 200 for improving the communication quality of a radio.

If the voice signal of the user received at step S610 is a last one, the transmission-side radio according to an embodiment of the present invention sends a modem signal, corresponding to the voice data including an end identifier, to a reception-side radio.

The apparatus 200 for improving the communication quality of a radio operating in conjunction with the transmission-side radio temporarily stores the modem signal in order to solve the accumulation of voice data attributable to the difference between the compression ratio of the voice codec and the transfer rate of the modem.

Furthermore, the apparatus 200 for improving the communication quality of a radio may identically set the compression ratio of the voice codec and the transfer rate of the modem in a normal mode, and may set the transfer rate of the modem to a value lower than the compression ratio of the voice codec in a communication quality improvement mode.

A method of improving the communication quality of a reception-side radio is described in detail below with reference to FIG. 7.

Figure 7:
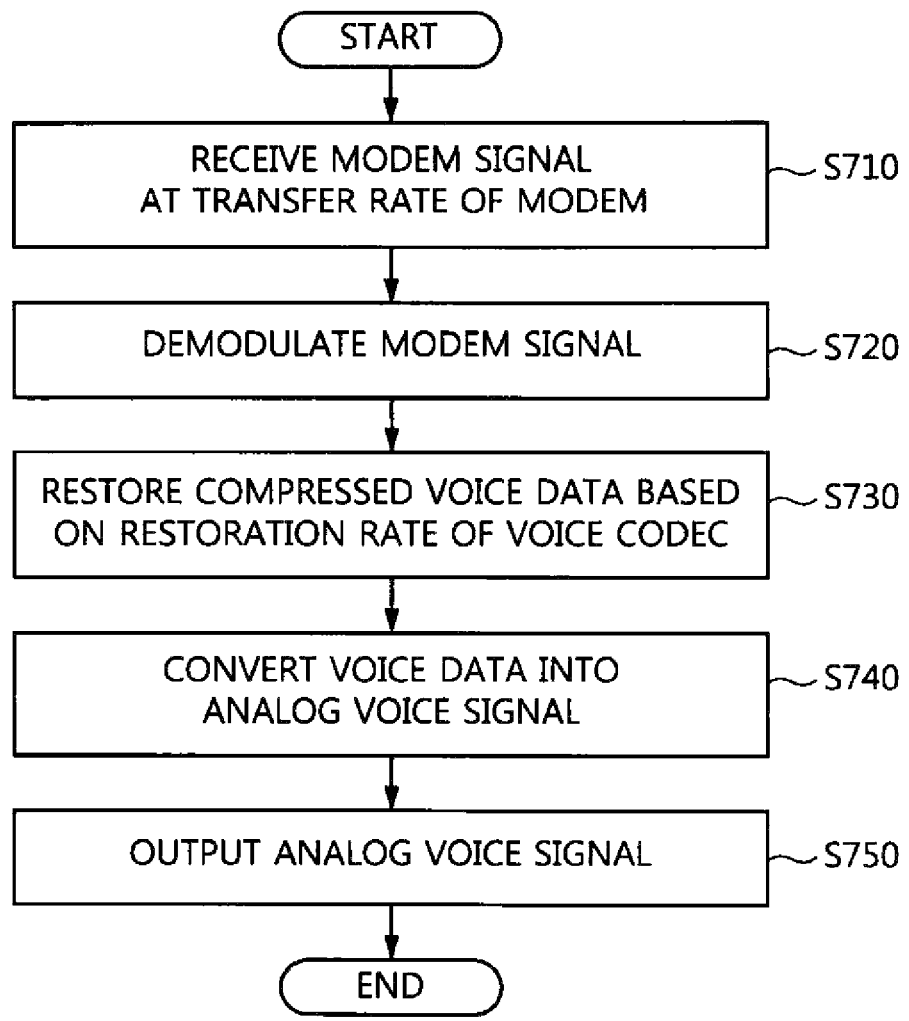
FIG. 7 is a flowchart illustrating a method of improving the communication quality of a reception-side radio according to an embodiment of the present invention.

FIG. 7 is a flowchart illustrating a method of improving the communication quality of a reception-side radio according to an embodiment of the present invention.

Referring to FIG. 7, the reception-side radio receives a modem signal from a transmission-side radio at the reception rate of the modem, set by the apparatus 200 for improving the communication quality of a radio, over a radio channel at step S710.

At step S720, the reception-side radio demodulates the modem signal received at step S710.

At step S730, the reception-side radio restores compressed voice data, corresponding to the result of the demodulation obtained at step S720, at the restoration rate of the voice codec set by the apparatus 200 for improving the communication quality of a radio.

At step S740, the reception-side radio converts voice data, corresponding to the results restored at step S730, into an analog voice signal.

The reception-side radio outputs the converted analog voice signal at step S750. At step S750, if an end identifier is included in the voice data corresponding to the results restored at step S730, an analog voice signal corresponding to the voice data is output.

Furthermore, the apparatus 200 for improving the communication quality of a radio, which operates in conjunction with the reception-side radio, temporarily stores compressed voice data until the voice data of a corresponding communication session is fully received, in order to solve the problem that the playback of voice stops due to the difference between the reception rate of the modem and the restoration rate of the voice codec.

As described above, the present invention can efficiently provide a voice communication means even in an environment in which a change in channel is severe depending on the time and place, as in a short-wave channel, and in which voice communication is impossible using a common radio due to the high bit error of a channel.

Furthermore, if voice communication is possible using a common radio but communication quality is limited due to a transmission error or a limited transmission band, a voice communication means having a quality higher than the communication quality of the common radio can be provided using the method of improving the communication quality of a radio according to an embodiment of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of improving communication quality of a transmission-side radio, comprising:
   providing a speed setting menu for setting a compression ratio of a voice codec and a transfer rate of a modem, the menu providing a normal mode and a communication quality improvement mode, and data transfer rate corresponding to the compression ratio of the voice codec being identically or differently set to data transfer rate corresponding to the transfer rate of modem according to following algorithm associated with the speed setting menu;
   in response to receipt of the normal mode, setting both of the compression ratio of the voice codec and the transfer rate of the modem to an identical value,
   in response to receipt of the communication quality improvement mode, setting the transfer rate of the modem to a value smaller than the compression ratio of the voice codec, and in response to detection of a difference between the compression ratio of the voice codec and the transfer rate of the modem, temporarily storing modem signal before sending the modem signal to a reception-side radio;

converting a voice signal received into voice data;

compressing the voice data according to the compression ratio of a voice codec and the data transfer rate set by the normal mode or the improvement mode;

generating a modem signal by modulating the compressed voice data; and sending the modem signal based on a transfer rate of a modem set by the apparatus for improving communication quality.

2. The method of claim 1, wherein converting the voice signal into the voice data comprises assigning an end identifier to the voice data if the voice signal of the user received via the transmission-side radio corresponds to a finally received signal.

3. A method of improving communication quality of a reception-side radio, comprising:

receiving a modem signal from a transmission-side radio based on a reception rate of a modem set by an apparatus for improving communication quality, the apparatus providing a speed setting menu for setting a compression ratio of a voice codec and a transfer rate of a modem, wherein a normal mode and a communication quality improvement mode is provided, and data transfer rate corresponding to the compression ratio of the voice codec is identically or differently set to data transfer rate corresponding to the transfer rate of modem according to following algorithm associated with the speed setting menu;

in response to receipt of the normal mode, setting both of the compression ratio of the voice codec and the transfer rate of the modem to an identical value, in response to receipt of the communication quality improvement mode, setting the transfer rate of the modem to a value smaller than the compression ratio of the voice codec, and in response to detection of a difference between reception rate of the modem and restoration rate of the voice codec, temporarily storing voice data until voice data corresponding communication session being fully received;

generating compressed voice data by demodulating the modem signal;

restoring the compressed voice data to voice data based on a restoration rate of a voice codec set by the apparatus for improving communication quality; and converting the voice data into an analog voice signal, and outputting the analog voice signal; and outputting the analog voice signal corresponding to specific voice data if the specific voice data comprises an end identifier.

4. An apparatus for improving communication quality of a radio, comprising:

one or more units being configured and executed by a processor using algorithm associated with a non-transitory storage device, the one or more units comprising, a user input unit configured to receive a selection signal;

a display unit configured to include a speed setting menu;

in response to detection of a selection of a mode from the speed setting mode, a control unit configured to control a compression ratio of a voice codec and a transfer rate of a modem corresponding to a transmission-side radio, and a reception rate of a modem and a restoration rate of a voice codec corresponding to a reception-side radio, the control being performed by the selected mode, wherein data transfer rate corresponding to the compression ratio of the voice codec is identically or differently controlled to data transfer rate corresponding to the transfer rate of modem according to following algorithm associated with a mode selection of the speed setting menu;

in response to receipt of a normal mode, the processor is configured to set both of the compression ratio of the voice codec and the transfer rate of the modem to an identical value, in response to receipt of a communication quality improvement mode, the processor is configured to set the transfer rate of the modem to a value smaller than the compression ratio of the voice codec, and in response to detection of a difference between the compression ratio of the voice codec and the transfer rate of the modem, the processor is configured to temporarily store modem signal to a buffer unit before sending the modem signal to a reception-side radio.

5. The apparatus of claim 4, further comprising:

a sync processing unit configured to add an end identifier to voice data corresponding to a voice signal of the user finally received from the transmission-side radio.

6. The apparatus of claim 4, further comprising:

a sync processing unit configured to detect an end identifier of voice data received from a transmission-side radio in a reception-side radio, and to perform control so that an analog voice signal is output in response to receipt of voice data including the detected end identifier.

* * * * *